March 26, 1963   C. A. WILLIAMS ETAL   3,083,307
SYSTEM FOR DISTRIBUTING POWER WITHIN A BUILDING
Filed Dec. 6, 1957
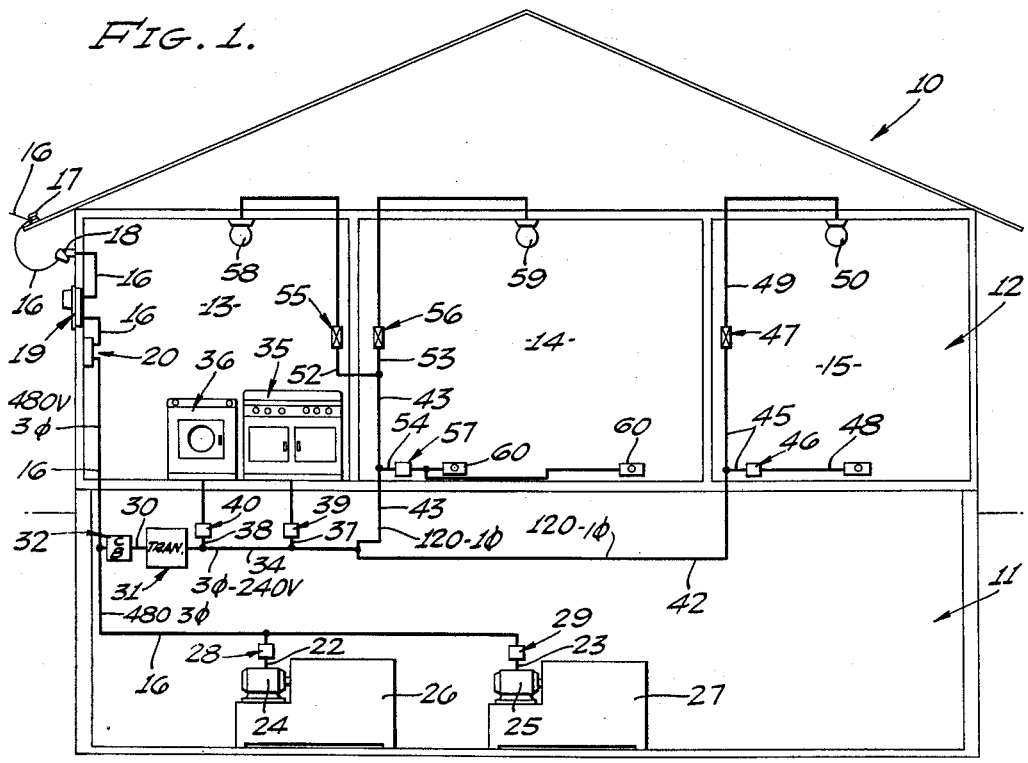
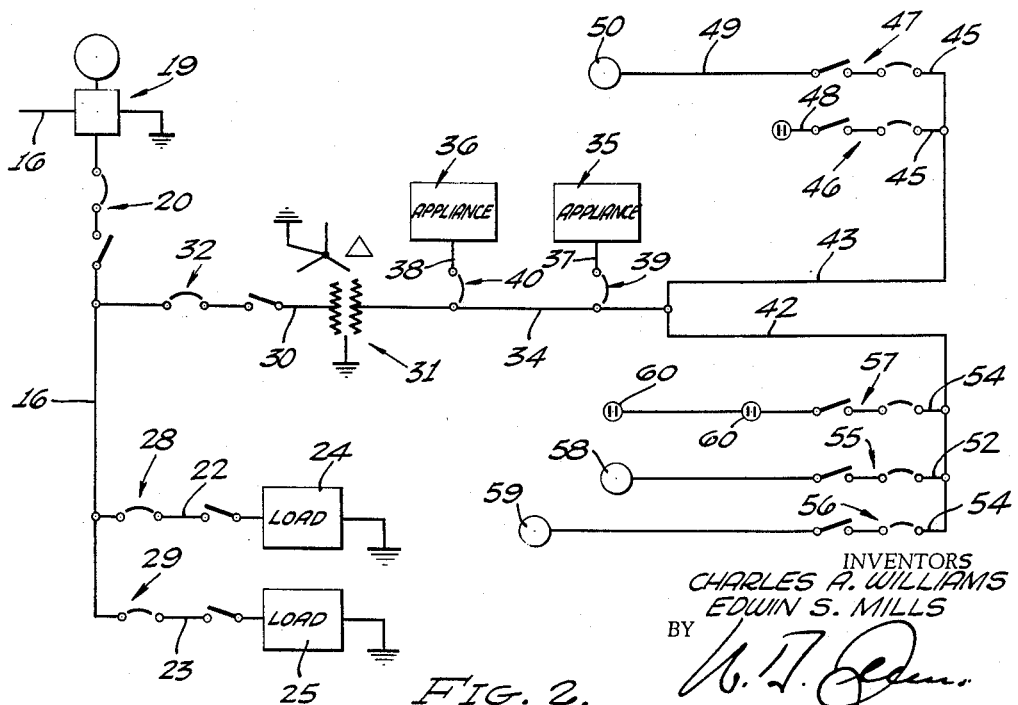
INVENTORS
CHARLES A. WILLIAMS
EDWIN S. MILLS
BY
ATTORNEY – # United States Patent Office 3,083,307
Patented Mar. 26, 1963

3,083,307
SYSTEM FOR DISTRIBUTING POWER WITHIN A BUILDING
Charles A. Williams, Ventura, Calif. (1230 W. Elder St., Oxnard, Calif.) and Edwin S. Mills, 1465 Valane Drive, Glendale, Calif.
Filed Dec. 6, 1957, Ser. No. 701,073
3 Claims. (Cl. 307—149)

This invention relates to electrical power distributing systems and more particularly to an improved method and wiring system for use in distributing power between a main power supply line and a plurality of outlets or specific loads distributed throughout a building being serviced.

It has long been conventional practice to distribute electrical energy through a building from a main power panel box located at the point of power supply to the building and the power consumption meter. Branch lines extend from this master panel box throughout the building with each branch line serving a different area or a particular appliance. The main panel box includes a master switch and a master protective device. Additionally, the panel box or separate boxes thereadjacent contain a master cut-out switch and separate protective devices for the supply end of the individual branch lines. Upon the occurrence of an overload in any branch circuit the protective device therefor acts to interrupt the power supply for that circuit until such time as a serviceman has inspected the branch for defects and corrected them so that the protective device can be reclosed with safety.

The described long standing conventional practice has certain disadvantages, prominent among these being the high cost of the system both as respects the materials required therefor and the labor to install and maintain this type of power distribution system. Much room is required to accommodate the numerous branch lines extending between the main panel box and each particular area of power consumption. Separate enclosing and protective coverings are required for each branch. Not only is it necessary to provide excessive footage of conductor cable and protective sheathing, but the user is encouraged to economize by cost factors by scrimping on the size of wire employed. In consequence, it is not uncommon to install a size no larger than the minimum required to carry the estimated load then contemplated. It is common experience that subsequently power needs increase from fifty to several hundred percent. Uninformed users often assume that no danger or inefficiency is involved in connecting additional loads without realization of the hazards or of the power losses involved.

Another serious handicap and shortcoming of prior power distributing systems is the need for visiting the main panel box each time the circuit breaker for a particular branch circuit operates to cut off the power. Customarily, the main panel box and the branch circuit protective devices are located in the building basement or in the building equipment or service room normally maintained locked against use by unauthorized persons. Even if the panel box is accessible, the large number of circuit breakers there found is confusing to inexperienced persons and attempts to reclose the open circuit breaker may lead to the accidental and unintended opening of other branch circuits to the inconvenience of other tenants of the building.

The power distributing system provided by the present invention obviates the foregoing and other shortcomings of prior systems. The invention to be disclosed in detail below is characterized by the elimination of the main panel box and all long branch circuits. Instead, the main power supply line has a lead-in extending to an entrance point at the building and through the power consumption meter and the master protective device from which a power distributing main extends generally centrally throughout the building using conductors of a size adequate to convey the full power requirements for the building. Branch lines are connected to this power distributing main at convenient points therealong and as close as feasible to the place of power consumption. The branch lines are connected directly to this distributing main independently of any fuses or other protective devices, although it will be understood that manual power disconnect switches may be used in order to isolate the branch lines while being serviced or modified. Normally, the individual branch lines are relatively short and lead directly to the general vicinity of the particular load being serviced. The terminal ends of such branch lines are protected by separate circuit breakers each having a capacity appropriate for the load being serviced. This protective device is located usually within 25 feet of the actual load. In consequence of the foregoing, great savings are realizable in the length and the size of the conductors and protective sheathing required for distributing a given power load. Another important advantage resides in the fact that the load for a given building may be increased as much as several hundred percent by the simple expedient of taking the precaution during installation of the power distributing system of using a sufficiently heavy main distribution line. Accordingly, additional branch lines may be added liberally thereafter without need for rewiring the building as a whole or need for extending a branch line from the main panel box in the basement to some far corner of the building.

It is therefore a primary object of the present invention to provide an improved system and method of distributing power from a main power supply line throughout a building being serviced and having numerous and important advantages over prior power distributing expedients.

Another object of the invention is the provision of a method of distributing power in a building obviating the need for a panel box and utilizing a feeder main extending centrally through a building to feed branch circuits spaced therealong and close to the point of load consumption with each branch terminal provided with a suitable circuit protective device.

Another object of the invention is the provision of a power distributing system in which the load protective device for the separate branch lines is close to if not within the same room as the load and conveniently accessible for servicing and reclosing whenever the need arises.

Another object of the invention is the provision of a power distributing system for a building having a master protective device near the place of power entry to the building and having a main power supply line leading through the building to feed branches having circuit protective devices only at their terminal ends or at the point of connection therewith of the load circuit.

These and other more specific objects will appear upon reading the following specification and claims and upon considering in connection therewith the attached drawing to which they relate.

Referring now to the drawing in which a preferred embodiment of the invention is illustrated:

FIGURE 1 is a vertical sectional view through a building showing generally the manner of installing the power distribution system of the present invention; and FIGURE 2 is a simplified schematic diagram of the power distributing system shown in FIGURE 1.

Referring first to FIGURE 1, there is shown a building designated generally 10 and understood to represent a single or a multiple occupancy dwelling or any commercial building. For example, this building may be of either single occupancy type dwelling, a large apartment building, an office building or a commercial building since the principles of this invention are applicable generally to all types of buildings. The building illustrated includes a basement or first level 11 and a second level 12 divided into any desired number of rooms, but here shown as having only three rooms 13, 14 and 15. The heavy duty lead-in line 16 has its outer end connected directly to the main power supply line, not shown, and will be understood to include either two, but preferably three wires suitably anchored to the building as by insulators 17. Lead-in wire 16 passes into a suitable pothead 18 extending through the wall of the building and having suitable connections to a power consumption meter 19 and to a master protective device 20 adapted to protect the entire distribution system against overload upon the failure of one or more other protective devices positioned along the distributing system as will be described presently.

It is pointed out that the supply voltage and the number of phases of the power supply may be of any conventional character. If a very heavy load is required, it may be desirable to employ a 480 volt, three-phase power supply. For the purposes of this disclosure it will be assumed that lead-in line 16 in FIGURES 1 and 2 is of this type and voltage.

Line 16 extends into basement 11 and is connected through branch lines 22, 23 with very heavy duty motors 24 and 25 driving large capacity appliances, such as air-conditioners 26, 27. Each of the motors 24 and 25 is protected by its own circuit breaker device 28, 29. Accordingly, should an overload or a defect occur in either of the motors, the circuit breaker associated with that particular motor will interrupt the power supply without interference with the continued operation of the other motor or of other portions of the distributing system.

Connected to the heavy duty lead-in power distributor 16 is a branch 30 supplying the primary of any suitable three-phase power transformer 31, the input side of this transformer being protected by a circuit breaker 32 at a point close to the transformer input. The secondary of the transformer is connected directly to a three-phase distributor main 34 at a suitable reduced voltage such as 240 volts. Main 34, though here shown as being relatively short, will be understood to extend generally centrally through that portion of the building having need for a 240 volts, three-phase power supply. As herein shown, typical loads connected directly to the 240 volt distributing main 34 include an electric kitchen range 35 and a heavy-duty drier 36, these being connected to main 34 through branch lines 37 and 38 respectively, and being individually protected by circuit breakers 39 and 40.

At either the remote end or at intervals along the intermediate voltage distributor main 34 there are connected one or more low voltage distribution mains such as the 120 volt mains 42 and 43. As here shown, mains 42 and 43 appear relatively short but it will be understood that they may extend for long distances generally centrally of the building and of the electrical load carried thereby. If the building is of the multiple floor type, it is preferable to extend a 120 volt main centrally of a given floor level and in such manner as to supply the floor level to either side thereof. Connected with the low voltage main 42 are branch lines 45 having at their terminal ends circuit breakers 46, 47 feeding individual load circuits 48, 49. Each of these local load circuits 48, 49 have a length conforming with the code requirements for the particular area as respects fuse protection. In many localities such codes limit the distance of the load 50 from a circuit breaker 47 at 25 feet. Other codes prescribe greater or shorter distances.

It will be understood that other low voltage distribution mains such as main 43 extend centrally through a different area of the building, each being connected to branch circuits such as 52, 53 and 54. The terminal end of each of these is provided with a circuit breaker 55, 56, 57, respectively, protecting the terminal load circuit connected with each and represented by the loads 58, 59 and 60.

It is pointed out that each of the circuit protective devices may and preferably does include suitable means for interrupting the circuit upon overload and also a manual switch on the output side of the circuit breaker for interrupting the power supply manually should this be desirable in order to isolate a portion of the distribution system while work is being performed thereon. In the case of the terminal load circuit, such manual switches are essential for turning the power on and off as desired. In the case of the smaller circuit breakers in particular, the circuit breaking device is preferably housed within the same box as the switch. Thus, in the case of lighting circuits the breaker protecting a given light circuit is housed directly in the same box as the control switches served by the circuit. In order to check the circuit breaker on the interruption of the power supply or upon the occurrence of some defect, the occupant merely inspects the controlling breaker found in the box housing the control switch. As will be apparent from the foregoing, it is known that the trouble is confined to that portion of the circuit located beyond the control switch and is usually confined to the same room.

While the particular power distributing system and method of distributing electrical energy herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. A power distributing system for use between a main power supply line and a building to be serviced thereby, said system comprising a main relatively high voltage lead-in line extending between the power line and a master protective device at the building, a distributing line extending from said master protective device through the building at individual floor levels, branch lines connected directly to said distributing line independently of protective devices and terminating in terminal boxes near individual power loads, and individual protective devices connected between the separate loads and the terminal end of the branch line therefor.

2. A power distributing system as defined in claim 1 characterized in that the individual ones of said loads are connected to one of said branch lines by power conducting leads not substantially in excess of 25 feet in length.

3. A power distributing system as defined in claim 1 characterized in the provision of a voltage reducer device having its input connected to said distributing line through a protective device spaced closely to said reducer device, at least one relatively low voltage distributing main extending from the output side of said voltage reducer, and individual branch lines and an associated protective device appropriate to the load to be supplied by a given branch line connected at spaced points along said low voltage distributing line, said last mentioned protective devices being near the terminal ends of said branch lines and close to the loads serviced thereby.

References Cited in the file of this patent

Standard Handbook for Electrical Engineers, 6th Ed., sections 16–56 to 16–75, pp. 1603–1606.

Book: "Wiring Diagrams of Electrical Apparatus and Installations," 1st. Ed., 1913; McGraw-Hill Book Co., TK 3205, W6, FIG. 409, pp. 245, 246.